(12) United States Patent
Wakashiro et al.

(10) Patent No.: US 8,417,408 B2
(45) Date of Patent: Apr. 9, 2013

(54) DRIVE CONTROL APPARATUS FOR HYBRID VEHICLE

(75) Inventors: Teruo Wakashiro, Sakura (JP); Yutaka Tamagawa, Utsunomiya (JP); Naohisa Morishita, Utsunomiya (JP); Tetsuya Hasebe, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/348,361

(22) Filed: Jan. 11, 2012

(65) Prior Publication Data

US 2012/0108386 A1     May 3, 2012

Related U.S. Application Data

(62) Division of application No. 11/705,413, filed on Feb. 13, 2007, now Pat. No. 8,116,924.

(30) Foreign Application Priority Data

Apr. 28, 2006    (JP) ................................ 2006-126712

(51) Int. Cl.
*B60L 11/00* (2006.01)
*B60K 6/20* (2007.10)

(52) U.S. Cl.
USPC ......................................... 701/22; 180/65.21

(58) Field of Classification Search ............... 701/22, 701/81; 180/174–179, 202, 6.28, 6.5, 214, 180/216, 218, 242, 279, 53.5, 60, 65.1–65.8, 180/407, 412, 415, 422, 443, 65.21; 318/158; 280/735, 707, 422; 340/428; 903/930
See application file for complete search history.

(56) References Cited

U.S. PATENT DOCUMENTS

| 5,111,784 | A | * | 5/1992 | Kuriyama et al. | ......... 123/192.1 |
| 6,644,427 | B2 | | 11/2003 | Schulte | |
| 7,213,666 | B2 | * | 5/2007 | Saito et al. | ............... 180/65.225 |
| 2003/0028295 | A1 | * | 2/2003 | Wakashiro et al. | ............. 701/22 |
| 2003/0045389 | A1 | | 3/2003 | Kima | |
| 2004/0181323 | A1 | * | 9/2004 | Yuan et al. | ...................... 701/22 |
| 2005/0197765 | A1 | | 9/2005 | Kido et al. | |
| 2005/0279546 | A1 | | 12/2005 | Tabata et al. | |
| 2006/0207811 | A1 | | 9/2006 | Miyao | |

FOREIGN PATENT DOCUMENTS

| CN | 2725077 Y | 9/2005 |
| JP | 47-011304 U | 10/1972 |
| JP | 06-189415 A | 7/1994 |

(Continued)

*Primary Examiner* — James Trammell
*Assistant Examiner* — Muhammad Shafi
(74) *Attorney, Agent, or Firm* — Arent Fox LLP

(57) ABSTRACT

A drive control apparatus for a hybrid vehicle which has an engine selectively set in one of a normal fuel-consumption operation mode and a low fuel-consumption operation mode for obtaining a lower fuel consumption; a generator selectively used for one of being driven by the engine and assisting driving of the engine; a motor for generating a driving force of the vehicle by electric power supplied by the generator or a battery device; and a clutch between the generator and wheels of the vehicle. The drive control apparatus has a control part for performing a low fuel-consumption driving assistance mode when the engine is set in the low fuel-consumption operation mode. In the low fuel-consumption driving assistance mode, the clutch is connected, and driving of the vehicle is assisted using one of the generator and the motor, which is selected in accordance with an operation state of the vehicle.

7 Claims, 11 Drawing Sheets

FOREIGN PATENT DOCUMENTS

| | | |
|---|---|---|
| JP | 07-067216 A | 3/1995 |
| JP | 08-098320 A | 4/1996 |
| JP | 11-182275 A | 7/1999 |
| JP | 2000-278814 A | 10/2000 |
| JP | 2001-245404 A | 9/2001 |
| JP | 2004-156774 A | 6/2004 |
| JP | 2004-208477 A | 7/2004 |
| JP | 2005-163718 A | 6/2005 |
| JP | 2006-514897 T | 5/2006 |
| WO | WO 2004/052672 A1 | 6/2004 |

\* cited by examiner

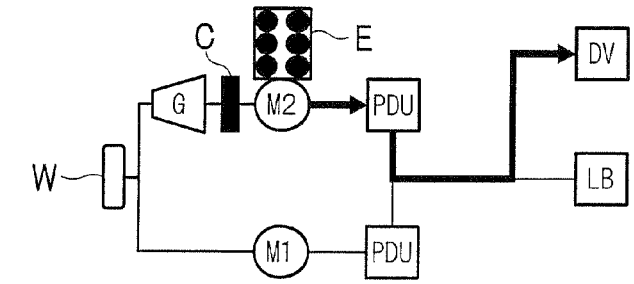
FIG. 10  V6 LOCK-UP MODE
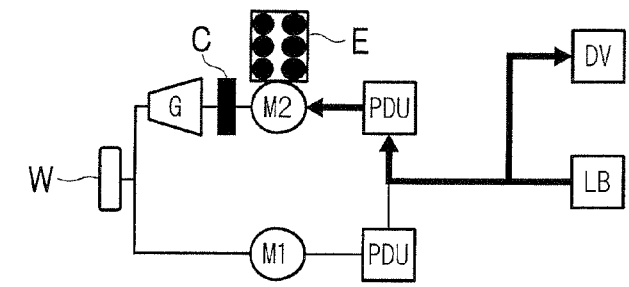
FIG. 11  V6 LOCK-UP P-ASSIST MOD
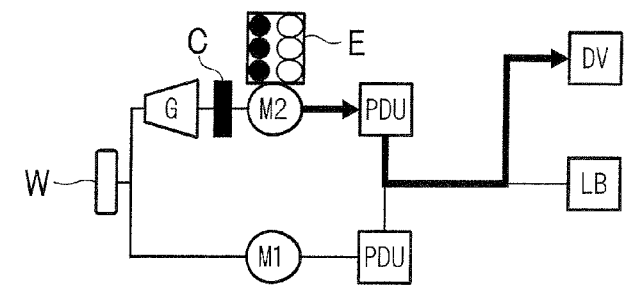
FIG. 12  CYLINDER STOP LOCK-UP MODE
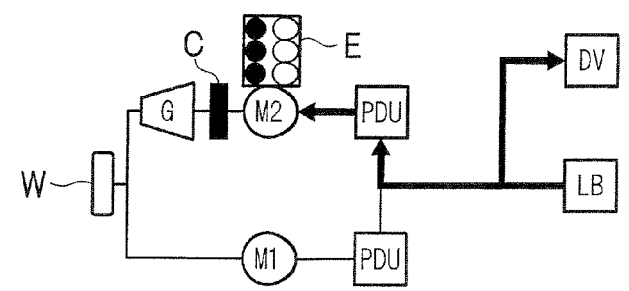
FIG. 13  CYLINDER STOP LOCK-UP P-ASSIST MODE

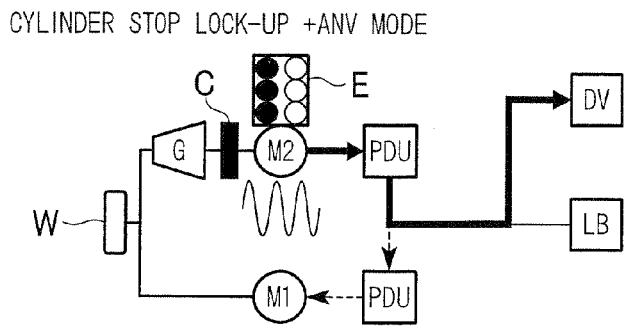
FIG. 14 CYLINDER STOP LOCK-UP +ANV MODE
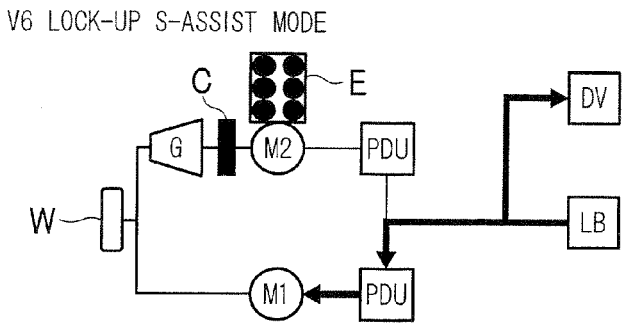
FIG. 15 V6 LOCK-UP S-ASSIST MODE
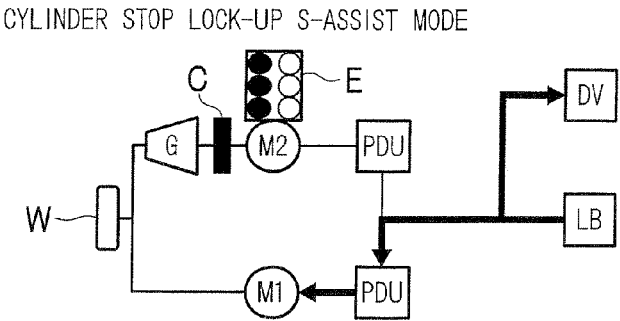
FIG. 16 CYLINDER STOP LOCK-UP S-ASSIST MODE
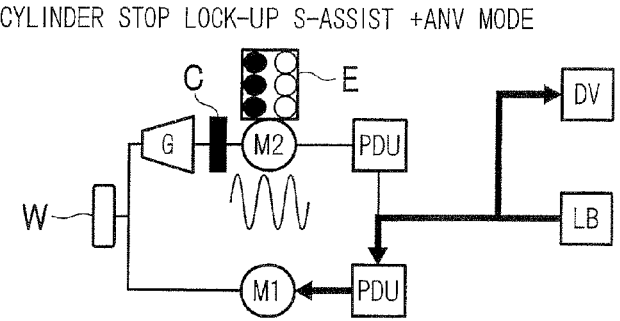
FIG. 17 CYLINDER STOP LOCK-UP S-ASSIST +ANV MODE

CYLINDER STOP LOCK-UP S-REGEN MODE

CYLINDER STOP LOCK-UP P-REGEN MODE

DRIVE CONTROL APPARATUS FOR HYBRID VEHICLE

CROSS-REFERENCED TO RELATED APPLICATION

This a Divisional application which claims the benefit of U.S. patent application Ser. No. 11/705,413, filed Feb. 13, 2007, which claims priority to Japanese Patent Application 2006-126712, filed on Apr. 28, 2006. The disclosure of the prior applications are hereby incorporated in their entirety by reference.-

BACKGROUND OF THE INVENTION

1. Field of the Invention

The present invention relates to a drive control apparatus for a hybrid vehicle which can run in a low fuel-consumption mode, in particular, a hybrid vehicle having a generator driven by an engine, and an (electric) motor driven by the generator or a battery device.

Priority is claimed on Japanese Patent Application No. 2006-126712, filed Apr. 28, 2006, the content of which is incorporated herein by reference.

2. Description of the Related Art

In a known example of a hybrid vehicle, a front motor is coupled to a crank shaft of an engine which can operate in a cylinder stop (or idle) mode, the front motor is connected to front wheels via a front clutch, and a rear motor is connected to rear wheels via a rear clutch. In an engine running mode, the hybrid vehicle runs with the front clutch connected so as to drive the engine, and in a first EV (electric vehicle) running mode of the hybrid vehicle, the engine is stopped and the front clutch is disconnected while the rear clutch is connected, so as to stop the front motor and run by only using the rear motor. In a second EV running mode of the hybrid vehicle, the engine is operated in a cylinder stop mode, the front clutch is disconnected, and the rear clutch is connected, so as to drive the front motor and run by only using the rear motor.

In accordance with the above hybrid vehicle, fuel consumption can be reduced (i.e., improved) by enlarging a range or area in which the vehicle can run using only the motor while the engine is stopped (see Japanese Unexamined Patent Application, First Publication No. 2004-208477).

In the above conventional structure, fuel consumption can be improved by combining the enlargement of the running range using the motor with the cylinder stop operation. However, when the vehicle runs using only the motor, the motor may be used in an inefficient range.

SUMMARY OF THE INVENTION

In light of the above circumstances, an object of the present invention is to provide a drive control apparatus for a hybrid vehicle, for providing most efficient driving in consideration of the operation state of the generator or the motor.

Therefore, the present invention provides a drive control apparatus for a hybrid vehicle, wherein:

the hybrid vehicle comprises:
an engine (e.g., an engine E in an embodiment described later) which is selectively set in one of a normal fuel-consumption operation mode (e.g., a V6 operation mode in the embodiment) and a low fuel-consumption operation mode (e.g., a cylinder-stop operation mode in the embodiment) for obtaining a lower fuel consumption in comparison with the normal fuel-consumption operation mode;

a generator (e.g., a second motor M2 in the embodiment) selectively used for one of being driven by the engine and assisting driving of the engine;

a motor (e.g., a first motor M1 in the embodiment) for generating a driving force of the vehicle by electric power supplied by the generator or a battery device (e.g., a battery LB in the embodiment); and a clutch (e.g., a clutch C in the embodiment) provided between the generator and wheels (e.g., wheels W in the embodiment) of the vehicle, and the drive control apparatus comprises:

a control part for performing a low fuel-consumption driving assistance mode (refer to steps S065, S066, and S068 in the embodiment) when the engine is set in the low fuel-consumption operation mode, wherein in the low fuel-consumption driving assistance mode:

the clutch is connected; and
driving of the vehicle is assisted using one of the generator and the motor, which is selected in accordance with an operation state of the vehicle.

In accordance with the above structure, a required driving force to be assisted (or a required acceleration) can be provided by assisting the driving force of the engine while the low fuel-consumption operation mode is maintained. Therefore, the fuel consumption can be further improved, thereby improving salability.

Preferably, when one of the generator and the motor is selected, one having a higher efficiency is selected. Accordingly, the driving force assistance of the vehicle can be performed with a minimum loss, thereby improving the fuel consumption.

In a preferable example, the drive control apparatus includes:

a vehicle speed measuring device (e.g., a vehicle speed sensor in the embodiment) for measuring a vehicle speed (e.g., a vehicle speed VP in the embodiment) of the vehicle, wherein:

when the vehicle speed measured by the vehicle speed measuring device is lower than a threshold (e.g., an upper-limit vehicle speed VPTMASTH for performing the driving force assistance using the first motor M1 during a lock-up mode in the embodiment) which is determined in consideration of efficiencies of the generator and the motor, the control part performs a low fuel-consumption motor driving-assistance mode (refer to steps S065 and S066 in the embodiment) in which the motor is selected for assisting the driving of the vehicle, and when the vehicle speed measured by the vehicle speed measuring device is higher than or equal to the threshold, the control part performs a low fuel-consumption generator driving-assistance mode (refer to step S068 in the embodiment) in which the generator is selected for assisting the driving of the vehicle.

In this case, the driving force assistance can be effectively performed in consideration of a use-range difference (with respect to the rotation speed) between the motor and the generator in accordance with their characteristics. Therefore, it is possible to minimize the power consumption.

In a typical example, the engine can perform a cylinder stop operation in the low fuel-consumption operation mode; and when the driving of the vehicle is assisted using the motor, the control part performs a cylinder stop driving-assistance vibration-control mode (refer to step S066 in the embodiment) in which the generator is driven for canceling a vibration of the engine.

In this case, a required driving force to be assisted can be provided by canceling an engine vibration while the cylinder stop operation is maintained. Therefore, it is possible to improve the fuel consumption in response to the enlarged cylinder stop operation and thus to improve the salability.

The drive control apparatus may further comprise:

a required driving force measuring device (refer to step S005 in the embodiment) for measuring a required driving force (e.g., a required driving force FREQF in the embodiment) of the vehicle, wherein:

when the engine is set in the low fuel-consumption operation mode, the control part performs a low fuel-consumption generator power-generation mode (refer to steps S061 and S062 in the embodiment) in which:

the clutch is connected, and when the required driving force measured by the required driving force measuring device is less than a predetermined value (e.g., an upper-limit driving force FCYL3 for implementing a cylinder-stop operation mode in the embodiment), the generator is driven by the engine.

Accordingly, when a relatively small driving force is required, a surplus of the driving force of the engine can be used for generating electric power via the generator, thereby improving the fuel consumption.

In this case, preferably, the engine can perform a cylinder stop operation in the low fuel-consumption operation mode; and when the low fuel-consumption generator power-generation mode is active, the control part executes a cylinder stop generator power-generation vibration-control mode (refer to step S062 in the embodiment) in which the generator is driven for canceling a vibration of the engine.

Accordingly, the generator can be continuously driven by the engine by canceling an engine vibration while the cylinder stop operation is maintained. Therefore, the power generation state using the generator can be maintained, thereby improving the fuel consumption.

In this case, the drive control apparatus may further comprise:

an engine speed measuring device (e.g., an engine speed sensor in the embodiment) for measuring an engine speed (e.g., an engine speed NE in the embodiment) of the engine; and an intake-pipe negative-pressure measuring device (e.g., an intake-pipe negative-pressure sensor in the embodiment) for measuring an intake-pipe negative pressure (e.g., an intake-pipe negative pressure PB in the embodiment), wherein:

the control part determines whether the generator is driven for canceling the vibration of the engine based on results of measurements by the engine speed measuring device and the intake-pipe negative-pressure measuring device (refer to steps S059 and S060 in the embodiment).

Accordingly, it is possible to maximize a cylinder stop operation area which is restricted by the engine speed and the intake-pipe negative pressure, and thus to improve the fuel consumption in response to the enlarged cylinder stop operation area.

The present invention also provides a drive control apparatus for a hybrid vehicle, wherein:

the hybrid vehicle comprises:

an engine which can perform a cylinder stop operation;

a generator selectively used for one of being driven by the engine and assisting driving of the engine;

a motor for generating a driving force of the vehicle by electric power supplied by the generator or a battery device; and a clutch provided between the generator and wheels of the vehicle, and the drive control apparatus comprises:

a required driving force measuring device for measuring a required driving force of the vehicle;

an operation mode switching device (refer to steps S054, S055, and S056 in the embodiment) for selecting, when the clutch is connected, one of:

a cylinder stop operation mode (refer to steps S061, S062, S065, S066, and S068 in the embodiment) for performing the cylinder stop operation, a cylinder stop driving-assistance mode (refer to steps S065, S066, and S068 in the embodiment), which belongs to the cylinder stop operation mode, and in which driving of the vehicle is assisted using one of the generator and the motor, and a full-cylinder operation mode (refer to steps S058, S069, and S070 in the embodiment) in which no cylinder is stopped, where the selection is performed based on the required driving force;

a vehicle speed measuring device for measuring a vehicle speed of the vehicle;

a selection device (refer to steps S057 and S067 in the embodiment) for selecting, when one of the cylinder stop driving-assistance mode and the full-cylinder operation mode is selected by the operation mode switching device, one of the generator and the motor for assisting the driving of the vehicle, based on the vehicle speed measured by the engine speed measuring device;

an engine speed measuring device for measuring an engine speed of the engine;

an intake-pipe negative-pressure measuring device for measuring an intake-pipe negative pressure; and a vibration control determination device (refer to steps S059, S060, S063, and S064 in the embodiment) for determining, when one of the cylinder stop operation mode and the cylinder stop driving-assistance mode is selected by the operation mode switching device, whether the generator is driven for canceling a vibration of the engine based on the engine speed and the intake-pipe negative pressure.

In accordance with the above structure, (i) the operation mode can be switched actively, (ii) one of the motor and the generator, which is more efficient, can be selected for assisting the driving force of the engine, and (iii) the generator can be driven for the engine-vibration control (when necessary) so as to enlarge the cylinder-stop operation area. Therefore, it is possible to considerably improve the fuel consumption.

The above drive control apparatus may further comprise:

a required driving force measuring device for measuring a required driving force of the vehicle; and a vehicle speed measuring device for measuring a vehicle speed of the vehicle, wherein:

when the vehicle speed measured by the required driving force measuring device is lower than or equal to a predetermined value (e.g., "NO" in step S008 in the embodiment, wherein the predetermined value is a lock-up clutch fastening lower-limit vehicle speed VPLC for fastening the clutch in the embodiment), and the required driving force measured by the required driving force measuring device is larger than or equal to a predetermined value (e.g., "NO" in step S007 in the embodiment, wherein the predetermined value is zero), the control part performs an EV mode (refer to steps S036, S038, and S039 in the embodiment) in which the clutch is disconnected and the driving force of the vehicle is generated by the motor.

In accordance with the EV mode in which the fuel consumption is reduced (may be zero) by the engine, it is possible to improve the fuel consumption.

The above-described preferable example of the drive control apparatus may further comprise:

a required output power measuring device (refer to step S006 in the embodiment) for measuring required output power (e.g., required output power PREQ in the embodiment) of the vehicle, wherein:

when the required output power measured by the required output power measuring device is higher than an upper-limit output power threshold (e.g., an upper-limit driving output PREQLMT for a BATT EV mode in the embodiment) which is set based on an amount of remaining power of the battery device (refer to step S032 in the embodiment), if the amount of remaining power of the battery device is larger than or equal to a threshold for forced charging (e.g., "NO" in step S037 in the embodiment, wherein the threshold is a lower-limit SOCCHG of remaining power for performing a forced charging operation in the embodiment), the control part performs an E-PASS EV mode (refer to step S038 in the embodiment) in which the generator is driven by the engine, and electric power generated by the generator is supplied to the motor, and if the amount of remaining power of the battery device is less than the threshold for forced charging (e.g., "YES" in step S037 in the embodiment), the control part performs a CHRGE EV mode (refer to step S036 in the embodiment) in which the generator is driven by the engine, and electric power generated by the generator is supplied to the storage device and the motor.

In accordance with the E-PASS EV mode, the engine can be efficiently driven, so as to effectively perform an EV running operation. Additionally, in accordance with the CHRGE EV mode, the battery device can be charged in addition to the operation in the E-PASS EV mode.

The above-described preferable example of the drive control apparatus may also further comprise:

a vehicle speed measuring device for measuring a vehicle speed of the vehicle; and a required driving force measuring device for measuring a required driving force of the vehicle, wherein:

when the required driving force measured by the required driving force measuring device is smaller than zero (e.g., "YES" in step S007 in the embodiment), if the clutch is disconnected (e.g., "NO" in step S027 in the embodiment), the control part performs an S-REGEN (series regeneration) mode (refer to step S029 in the embodiment) in which regeneration of electric power is performed using the motor, if the clutch is connected (e.g., "YES" in step S027 in the embodiment) and the vehicle speed measured by the vehicle speed measuring device is lower than a predetermined value (e.g., "YES" in step S028 in the embodiment, wherein the predetermined value is a lock-up clutch fastening lower-limit vehicle speed VPDECLCL defined for deceleration), then the control part performs a cylinder stop lock-up S-REGEN mode (refer to step S030 in the embodiment) in which the engine performs the cylinder stop operation and regeneration of electric power is performed using the generator, and if the clutch is connected and the vehicle speed measured by the vehicle speed measuring device is higher than or equal to the predetermined value (e.g., "NO" in step S028 in the embodiment, wherein the predetermined value is the above lock-up clutch fastening lower-limit vehicle speed VPDECLCL), then the control part performs a cylinder stop lock-up P-REGEN (parallel regeneration) mode (refer to step S031 in the embodiment) in which the engine performs the cylinder stop operation and regeneration of electric power is performed using the motor.

In accordance with the S-REGEN mode, energy can be effectively provided to the battery device or "12V consumers" without being affected by a pumping loss of the engine. In addition, one of the motor of the generator, which can efficiently generate electric power, can be selected by switching the mode between the cylinder stop lock-up S-REGEN mode and the cylinder stop lock-up P-REGEN mode in accordance with the vehicle speed. Therefore, electric power can be efficiently generated.

BRIEF DESCRIPTION OF THE DRAWINGS

FIG. 10 is a schematic diagram explaining a V6 lock-up mode.

FIG. 11 is a schematic diagram explaining a V6 lock-up P-ASSIST mode.

FIG. 12 is a schematic diagram explaining a cylinder stop lock-up mode.

FIG. 13 is a schematic diagram explaining a cylinder stop lock-up P-ASSIST mode.

FIG. 14 is a schematic diagram explaining a cylinder stop lock-up+ANV mode.

FIG. 15 is a schematic diagram explaining a V6 lock-up S-ASSIST mode.

FIG. 16 is a schematic diagram explaining a cylinder stop lock-up S-ASSIST mode.

FIG. 17 is a schematic diagram explaining a cylinder stop lock-up S-ASSIST+ANV mode.

DETAILED DESCRIPTION OF THE INVENTION

Hereinafter, an embodiment in accordance with the present invention will be described with reference to the appended figures.

Figure 1:
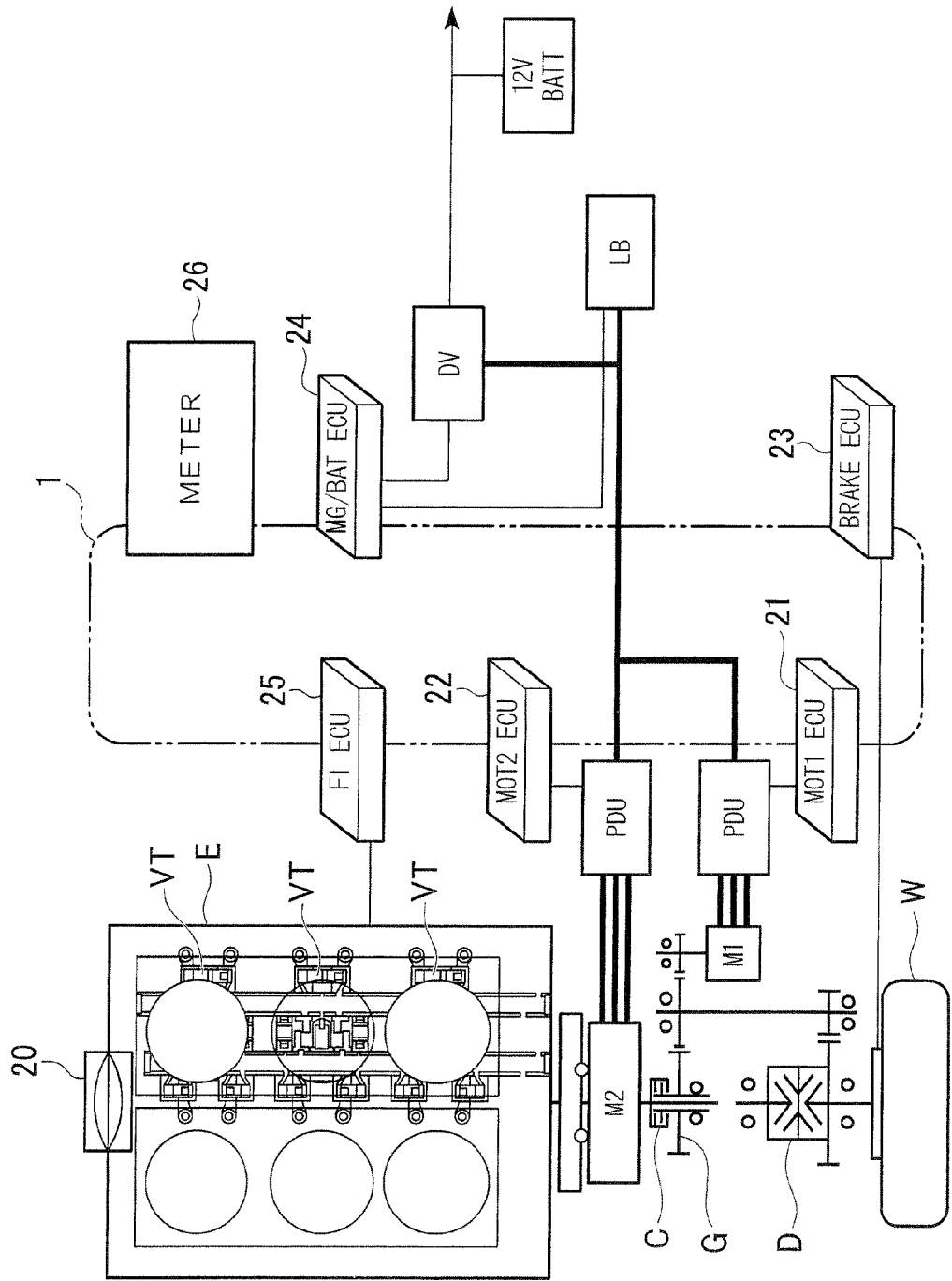
FIG. 1 is a schematic diagram showing the general structure of a hybrid vehicle with respect to an embodiment of the present invention.

FIG. 1 shows the structure of a hybrid vehicle with respect to an embodiment of the present invention. This hybrid vehicle can run using only a first motor M1. A second motor M2 is coupled with a crank shaft of a V6 cylinder engine E. A speed change gear box G is connected to the second motor M2 via a clutch C.

The speed change box G is, for example, a 5-speed gear box, and transmits a driving force to right and left driving (front or rear) wheels W of the vehicle via a final gear and a differential gear D for distributing the driving force between the right and left driving wheels W. The first motor M1 cooperates with the final gear, and transmits power via the final gear and the differential gear D, to the driving wheels W.

The first motor M1 and the second motor M2 each may be a three-phase DC brushless motor, and are connected to a power drive unit PDU. To each power drive unit PDU, a high-voltage Li-ion battery LB is connected, which sends and receives electrical energy to and from the corresponding motor (M1 or M2).

In a control operation explained below, the first motor M1 and the second motor M2 are set in a manner such that their operation ranges overlap at around 3000 rpm, which is known as the most efficient speed of the motor, and both motors can operate within a range defined around the overlapped area. The active motor (i.e., which is presently used) is selected mainly in accordance with a vehicle speed VP (a speed of the vehicle). More specifically, a motor system is constructed in a manner such that the first motor M1 is highly efficient in a relatively low vehicle-speed range while the second motor M2 is highly efficient in a relatively high vehicle-speed range.

The driving and regenerating operation of each of the motors M1 and M2 is performed by the corresponding power drive unit PDU which receives a control command issued by a control part 1. For example, in order to drive the first motor M1, the power drive unit PDU converts DC (direct current) electric power, which is output from the battery LB, to three-phase AC (alternating current) electric power, and supplies the power to the first motor M1, in accordance with a torque command issued by the control part 1. In order to perform regeneration via the first motor M1, the power drive unit PDU converts the three-phase AC electric power, which is supplied from the first motor ML to DC electric power, and charges the battery LB with the DC electric power.

A 12V auxiliary battery "12V BATT" for driving various accessories (which function as "12V consumers") is connected in parallel to each power drive unit PDU and the battery LB via a so-called "downverter" DB which is a DC-DC converter. The downverter DB, controlled by the control part 1, charges the 12V auxiliary battery "12V BATT" by dropping the voltage of each power drive unit PDU or the battery LB.

As described above, the engine E is a V6 cylinder engine, and it has two banks. Three cylinders belong to one of the banks, and each of the three cylinders has a hydraulic variable-timing valve mechanism VT which enables a cylinder stop (or idle) operation. The other three cylinders belong to the other bank, and each of the three cylinders has an ordinary valve operation mechanism (not shown) which performs no cylinder stop operation. In the present embodiment, each of the three cylinders (which enable the cylinder stop operation) performs the cylinder stop operation using two intake valves and two exhaust valves, all of which maintain a closed state via the corresponding hydraulic variable-timing valve mechanism VT.

Accordingly, the operation of the engine E is switched between a three-cylinder operation (i.e., a cylinder stop operation or a low fuel-consumption mode) in which the three cylinders belonging to said one of the banks are stopped, and a six-cylinder operation (i.e., a V6 operation or a normal fuel-consumption mode) in which all of the six cylinders belonging to both banks are active.

In addition, a vibration of the engine E, which is generated when the engine E operates in the three-cylinder operation (i.e., cylinder stop operation), is cancelled by using the second motor M2. It is of course possible to further provide an active engine mount for suppressing a vibration of the vehicle body.

The engine E has an electronic control throttle 20 for electronically controlling a throttle valve (not shown).

The electronic control throttle 20 directly controls the throttle valve in accordance with a degree of opening of the throttle valve, which is calculated by the control part 1 based on, for example, an accelerator-pedal opening degree AP corresponding to the degree of depression of an accelerator pedal (not shown) by the driver of the vehicle, the driving state of the vehicle such as the vehicle speed VP or an engine (rotation) speed NE of the engine E, and a torque distribution state between the engine E and the first motor M1 or the second motor M2.

To the control part 1, signals output from the following devices are input, such as (i) a vehicle speed sensor for measuring the vehicle speed VP, (ii) an engine water temperature sensor for measuring a temperature of water for the engine E (i.e., engine water temperature TW), (iii) a catalyst temperature sensor for measuring a catalyst temperature CAT, (iv) an engine speed sensor for measuring the engine speed NE, (v) a shift position sensor for detecting each shift position such as a front gear F, a rear gear R, a parking gear P, or a neutral gear N, (vi) a brake switch for determining the operation state of a brake pedal BR, (vii) an accelerator pedal opening-degree sensor for measuring the accelerator-pedal opening degree AP corresponding to the degree of depression of the accelerator pedal, (viii) a throttle opening-degree sensor for measuring a throttle opening degree TH, (ix) an intake-pipe negative-pressure sensor for measuring an intake-pipe negative pressure PB, (x) a battery temperature sensor for measuring a temperature TBAT of the battery LB, and (xi) a POIL sensor for measuring an oil pressure of a side where the cylinder stop operation is released while the cylinder stop operation is performed, and the like.

The control part 1 includes: (i) a MOT1 ECU (electronic control unit) 21 for controlling the driving and regenerating operation of the first motor M1 via the corresponding power drive unit PDU, (ii) a MOT2 ECU 22 for controlling the driving and regenerating operation of the second motor M2 via the corresponding power drive unit PDU, (iii) a BRAKE ECU 23 for controlling a brake device so as to stabilize the movement of the vehicle, (iv) an MG/BAT ECU 24 for monitoring and protecting a high-voltage electrical equipment system which may include the power drive unit PDUs, the battery LB, the downverter DV, the first motor M1, and the second motor M2, and controlling the operation of the power drive unit PDUs and the downverter DV, and (v) an FI ECU 25 for controlling the fuel supply to the engine E, the ignition timing, and the like. The above ECUs 21 to 25 are connected to a meter 26 which includes instruments for showing various state quantities.

The operation modes of the present embodiment will be explained with reference to FIGS. 2 to 19.

The present hybrid vehicle has two general modes: one is active when the clutch C is connected (i.e., ON), that is, in a lock-up state (in which the crank shaft of the engine E and the speed change box G are directly coupled via the second motor M2), and the other is active when the clutch C is disconnected (i.e., OFF).

In addition to the state of the clutch C, the operation mode is switched between various modes, in accordance with:

(i) whether the engine E is (a) in the full-cylinder operation (i.e., V6 operation) mode, (b) in the three-cylinder operation (i.e., cylinder stop) mode, or (c) stopped, (ii) whether the first motor M1 is (a) generating a driving force, (b) generating electric power while the engine is stopped (i.e., in the regeneration mode), (c) generating electric power while the engine operates, (d) stopping, or (e) rotating, where the generated torque is zero, (iii) whether the second motor M2 is (a) generating a driving force, (b) generating electric power while the engine is stopped (i.e., in the regeneration mode), (c) generating electric power while the engine operates, (a) stopping, (e) rotating, where the generated torque is zero, or (f) in a vibration control mode (called "ANV"), or (iv) whether the battery LB is (a) discharging, (b) charging, or (c) in a zero battery-end state (i.e., not discharging nor charging) which includes using the battery LB by alternating the charging and discharging so as to drive the second motor M2 in the vibration control mode.

Figure 2:
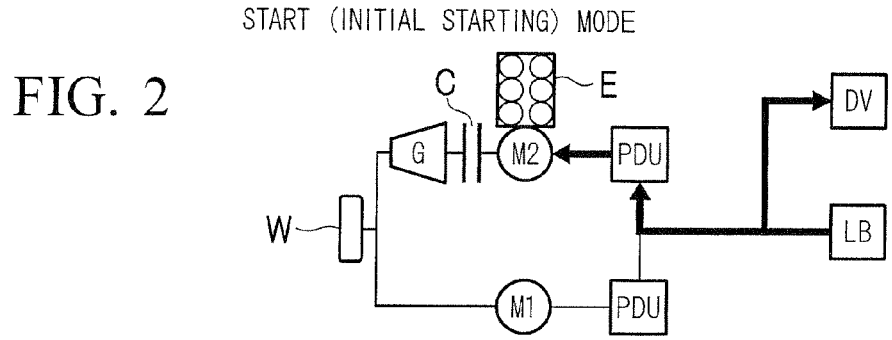
FIG. 2 is a schematic diagram explaining a start (initial starting) mode.

FIG. 2 shows a START (or initial starting) mode. In this operation mode, the clutch C is disconnected, the engine E is stopped, the first motor M1 is stopped, the second motor M2 is generating a driving force, and the battery LB is discharging. That is, the engine E is started when the vehicle stands completely still. When the vehicle is started by switching an ignition key (or switch) on, electric power is supplied from the battery LB so as to drive the second motor M2 and start the engine E, and simultaneously, electric power is supplied via the downverter DV to the above-described 12V consumers and the 12V auxiliary battery "12V BATT".

Figure 3:
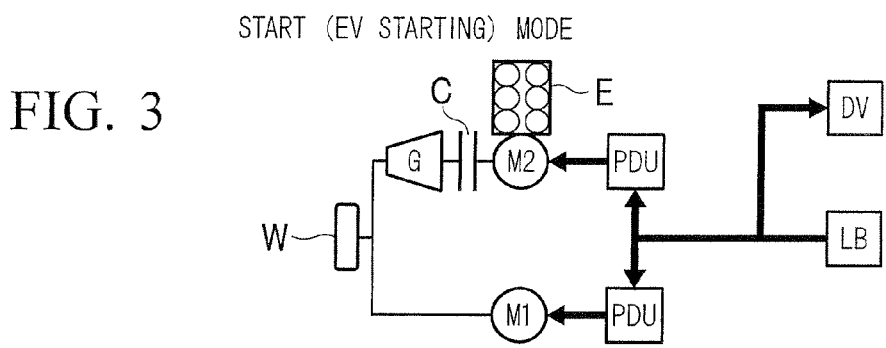
FIG. 3 is a schematic diagram explaining a start (EV starting) mode.

FIG. 3 shows a START (EV starting) mode. In this operation mode, the clutch C is disconnected, the engine E is stopped, the first motor M1 and the second motor M2 each are generating a driving force, and the battery LB is discharging. That is, when the clutch C is disconnected, the engine E is stopped, and the vehicle runs using the first motor M1, electric power is supplied from the battery LB so as to drive the second motor M2 and to start the engine E, and simultaneously, electric power is supplied via the downverter DV to the above-described 12V consumers and the 12V auxiliary battery "12V BATT".

Figure 4:
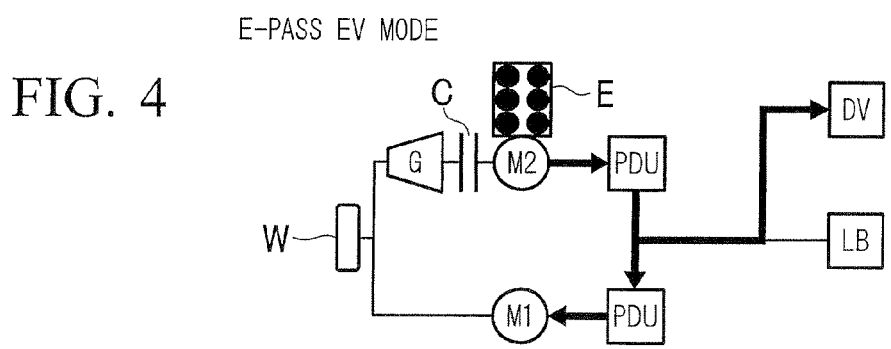
FIG. 4 is a schematic diagram explaining an E-PASS EV mode.

FIG. 4 shows an E-PASS EV mode. In this operation mode, the clutch C is disconnected, the engine E operates in the V6 operation mode, the first motor M1 is generating a driving force, the second motor M2 is generating electric power, and the battery LB is in the zero battery-end state. That is, the vehicle runs by driving the first motor M1 by using the electric power generated by the second motor M2, and simultaneously, electric power is supplied via the downverter DV to the above-described 12V consumers and the 12V auxiliary battery "12V BATT".

If the reverse position R is detected by the shift position sensor, the first motor M1 is reversely rotated so that the vehicle moves backward (i.e., in an E-PASS EV REVERSE mode).

Figure 5:
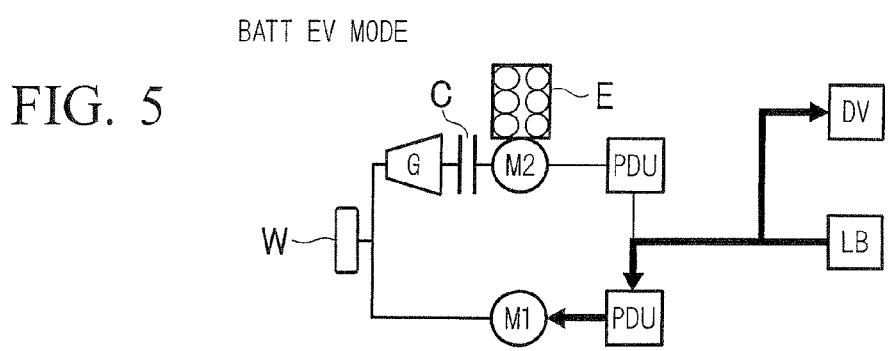
FIG. 5 is a schematic diagram explaining a BATT EV mode.

FIG. 5 shows a BATT EV mode. In this operation mode, the clutch C is disconnected, the engine E is stopped, the first motor M1 is generating a driving force, the second motor M2 is stopped, and the battery LB is discharging. This mode is used when, for example, the efficiency of electric power generation is low, and in this mode, the vehicle runs by driving the first motor M1 by only using the electric power supplied by the battery LB.

When the reverse position R is detected by the shift position sensor and the first motor M1 is reversely rotated, the vehicle moves backward (i.e., in a BATT EV REVERSE mode).

Figure 6:
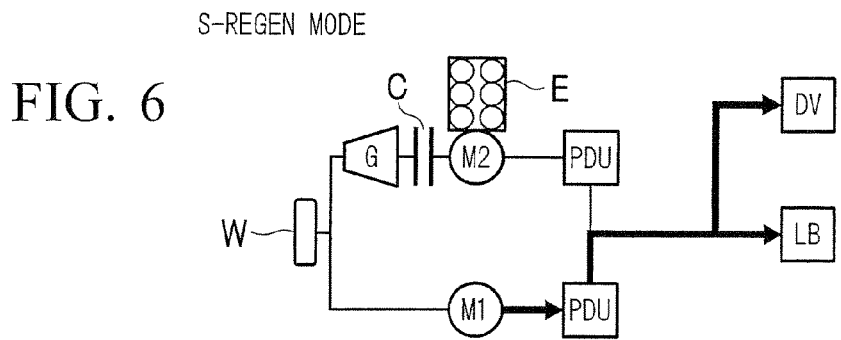
FIG. 6 is a schematic diagram explaining an S-REGEN mode.

FIG. 6 shows an S-REGEN mode. In this operation mode, the clutch C is disconnected, the engine E is stopped, the first motor M1 is generating electric power (i.e., in the regeneration mode), the second motor M2 is stopped, and the battery LB is charging. That is, regeneration is performed using the first motor M1 while the vehicle is decelerated, and electric power is supplied via the battery LB and the downverter DV to the above-described 12V consumers and the 12V auxiliary battery "12V BATT". In this mode, it is possible to obtain a maximum quantity of regeneration by omitting resistance due to the operation of the engine E or the second motor M2. Here, "S" in the S-REGEN mode is an abbreviation of "series", and indicates that the first motor M1 participates in the operation. In addition, "REGEN" indicates regeneration.

Figure 7:
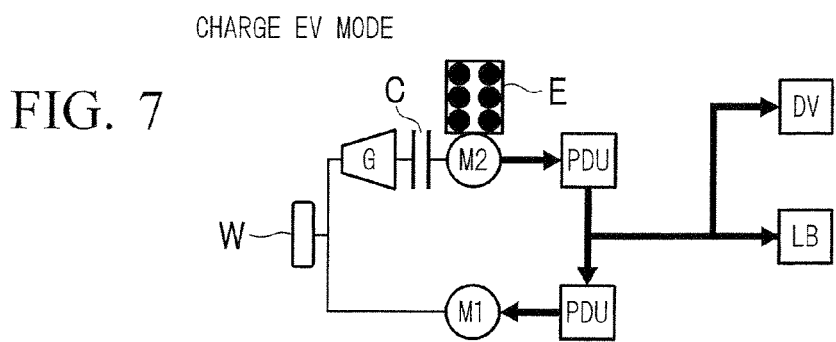
FIG. 7 is a schematic diagram explaining a CHARGE EV mode.

FIG. 7 shows a CHARGE EV mode. In this operation mode, the clutch C is disconnected, the engine E operates in the V6 operation mode, the first motor M1 is generating a driving force, the second motor M2 is generating electric power, and the battery LB is charging. That is, the second motor M2 generates electric power by which the vehicle runs via the first motor M1 and the battery LB is charged, and the electric power is also supplied via the downverter DV to the above-described 12V consumers and the 12V auxiliary battery "12V BATT".

Figure 8:
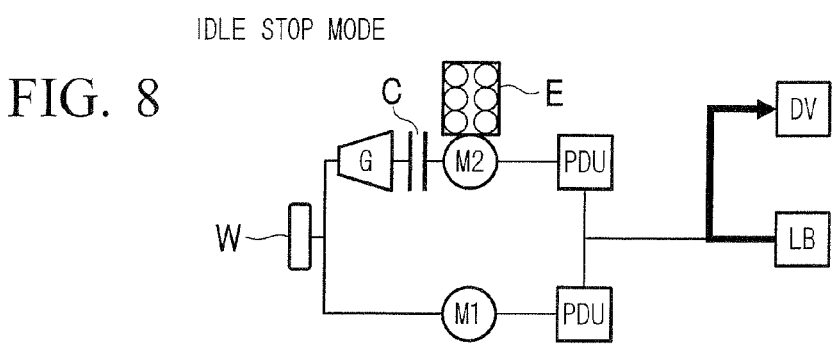
FIG. 8 is a schematic diagram explaining an IDLE stop mode.

FIG. 8 shows an IDLE stop mode. In this operation mode, the clutch C is disconnected, the engine E is stopped, the first motor M1 is stopped, the second motor M2 is also stopped, and the battery LB is discharging. That is, electric power is supplied from the battery LB via the downverter DV to the above-described 12V consumers and the 12V auxiliary battery "12V BATT".

Figure 9:
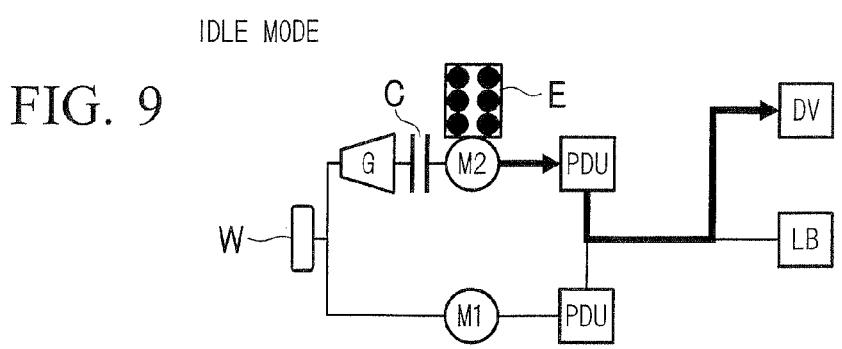
FIG. 9 is a schematic diagram explaining an IDLE mode.

FIG. 9 shows an IDLE mode. In this operation mode, the clutch C is disconnected, the engine E operates in the V6 operation mode, the first motor M1 is stopped, the second motor M2 is generating electric power, and the battery LB is in the zero battery-end state. That is, the second motor M2 generates electric power which is supplied via the downverter DV to the above-described 12V consumers and the 12V auxiliary battery "12V BATT".

FIG. 10 shows a V6 lock-up mode. In this operation mode, the clutch C is connected, the engine E operates in the V6 operation mode, the first motor M1 is rotating while the generated torque is zero, the second motor M2 is generating electric power, and the battery LB is in the zero battery-end state. That is, the second motor M2 generates electric power which is supplied via the downverter DV to the above-described 12V consumers and the 12V auxiliary battery "12V BATT", and the vehicle runs by the engine E.

FIG. 11 shows a V6 lock-up P-ASSIST mode. In this operation mode, the clutch C is connected, the engine E operates in the V6 operation mode, the first motor M1 is rotating while the generated torque is zero, the second motor M2 is generating a driving force, and the battery LB is discharging. That is, when a load of the vehicle slightly increases while the vehicle runs in the V6 lock-up mode, driving force of the engine E is assisted by the second motor M2 using the electric power supplied from the battery LB, and simultaneously, the electric power from the battery LB is supplied via the downverter DV to the above-described 12V consumers and the 12V auxiliary battery "12V BATT", so that the vehicle runs. Here, "P" in "P-ASSIST" is an abbreviation of "parallel", and indicates that the second motor M2 participates in the operation, and "ASSIST" indicates the above assistance.

FIG. 12 shows a cylinder stop lock-up mode. In this operation mode, the clutch C is connected, the engine E operates in the cylinder stop mode, the first motor M1 is rotating while the generated torque is zero, the second motor M2 is generating electric power, and the battery LB is in the zero battery-end state. That is, when the load of the vehicle decreases while the vehicle runs in the V6 lock-up mode, the engine E is operated in the cylinder stop mode, and the electric power generated by the second motor M2 is supplied via the downverter DV to the above-described 12V consumers and the 12V auxiliary battery "12V BATT", so that the vehicle runs using the engine E.

FIG. 13 shows a cylinder stop lock-up P-ASSIST mode. In this operation mode, the clutch C is connected, the engine E operates in the cylinder stop mode, the first motor M1 is rotating while the generated torque is zero, the second motor M2 is generating a driving force, and the battery LB is discharging. That is, when the load of the vehicle slightly increases while the vehicle runs in the cylinder stop lock-up mode, it is determined whether the engine E can be assisted while the cylinder stop operation is continued. If it can, driving force of the engine E, which is still in the cylinder stop mode, is assisted by the second motor M2 using the electric power from the battery LB, which is also supplied via the downverter DV to the above-described 12V consumers and the 12V auxiliary battery "12V BATT", so that the vehicle runs.

FIG. 14 shows a cylinder stop lock-up+ANV mode. In this operation mode, the clutch C is connected, the engine E operates in the cylinder stop mode, the first motor M1 is rotating while the generated torque is zero, the second motor M2 is in the vibration control mode, and the battery LB is in the zero battery-end state. That is, part of the electric power generated by the second motor M2 is supplied via the downverter DV to the above-described 12V consumers and the 12V auxiliary battery "12V BATT", and simultaneously, a driving force generated by the second motor M2 is used for controlling and canceling a vibration (or noise) of the engine E, which is caused by the cylinder-stop operation. In this case, as shown by dashed arrows in FIG. 14, the first motor M1 may be driven using part of the electric power generated by the second motor M2. Additionally, "ANV" indicates vibration control.

FIG. 15 shows a V6 lock-up S-ASSIST mode. In this operation mode, the clutch C is connected, the engine E operates in the V6 operation mode, the first motor M1 is generating a driving force, the second motor M2 is rotating while the generated torque is zero, and the battery LB is discharging. That is, when the load of the vehicle increases while the vehicle runs in the V6 operation mode, the first motor M1 is driven using the electric power supplied from the battery LB, so as to assist the driving force of the engine E, and simultaneously, the electric power from the battery LB is also supplied via the downverter DV to the above-described 12V consumers and the 12V auxiliary battery "12V BATT", so that the vehicle runs.

FIG. 16 shows a cylinder stop lock-up S-ASSIST mode. In this operation mode, the clutch C is connected, the engine E operates in the cylinder stop mode, the first motor M1 is generating a driving force, the second motor M2 is rotating while the generated torque is zero, and the battery LB is discharging. That is, when the load of the vehicle slightly increases while the vehicle runs in the cylinder stop lock-up mode, it is determined whether the engine E can be assisted while the cylinder stop operation is continued. If it can, driving force of the engine E, which is still in the cylinder stop mode, is assisted by the first motor M1 using the electric power from the battery LB, which is also supplied via the downverter DV to the above-described 12V consumers and the 12V auxiliary battery "12V BATT", so that the vehicle runs.

FIG. 17 shows a cylinder stop lock-up S-ASSIST+ANV mode. In this operation mode, the clutch C is connected, the engine E operates in the cylinder stop mode, the first motor M1 is generating a driving force, the second motor M2 is in the vibration control mode, and the battery LB is discharging. That is, the first motor M1 is driven so as to assist the driving force of the engine E, and the second motor M2 is used for controlling and canceling the vibration of the engine E.

Here, the second motor M2 may be used for performing the driving force assistance and the vibration control. However, in this case, one of the driving force assistance and the vibration control is restricted. Therefore, in the present mode, the driving force assistance and the vibration are distributed between the first motor M1 and the second motor M2 in the cylinder stop running operation, so that they can be performed without providing any restriction to each other. Accordingly, a (driving force) assistance range in the cylinder stop operation can be enlarged, so that frequency of mode-shift to the V6 operation is reduced, thereby improving the fuel consumption.

Figure 18:
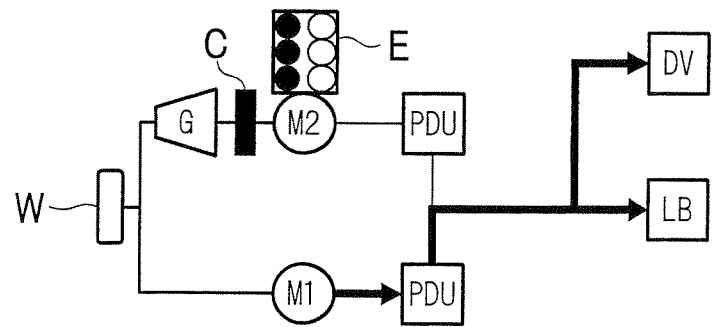
FIG. 18 is a schematic diagram explaining a cylinder stop lock-up S-REGEN mode.

FIG. 18 shows a cylinder stop lock-up S-REGEN mode. In this operation mode, the clutch C is connected, the engine E operates in the cylinder stop mode, the first motor M1 is generating electric power (i.e., in the regeneration mode), the second motor M2 is rotating while the generated torque is zero, and the battery LB is charging.

Figure 19:
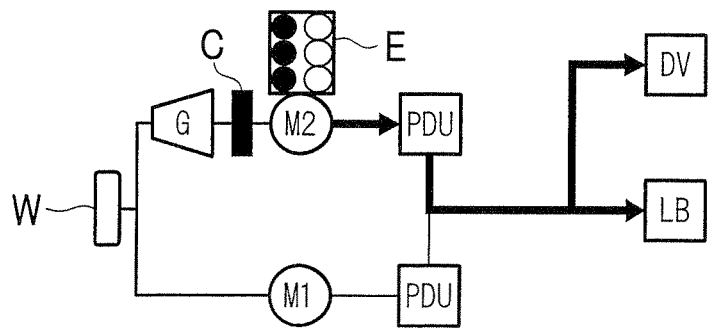
FIG. 19 is a schematic diagram explaining a cylinder stop lock-up P-REGEN mode.

FIG. 19 shows a cylinder stop lock-up P-REGEN mode. In this operation mode, the clutch C is connected, the engine E operates in the cylinder stop mode, the first motor M1 is rotating while the generated torque is zero, the second motor M2 is generating electric power (i.e., in the regeneration mode), and the battery LB is charging.

Figure 20:
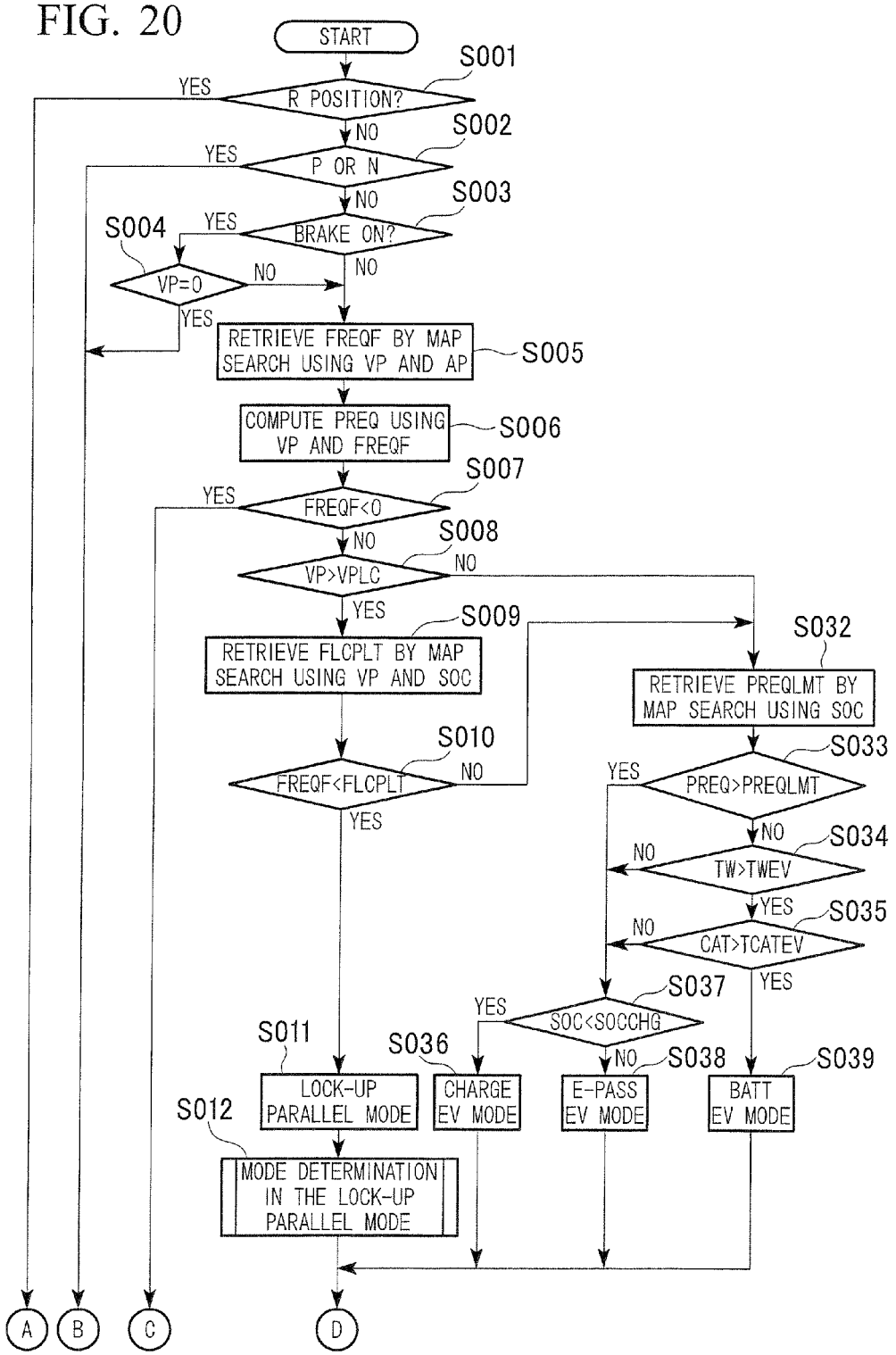
FIG. 20 is a flowchart for determining the operation.
Figure 21:
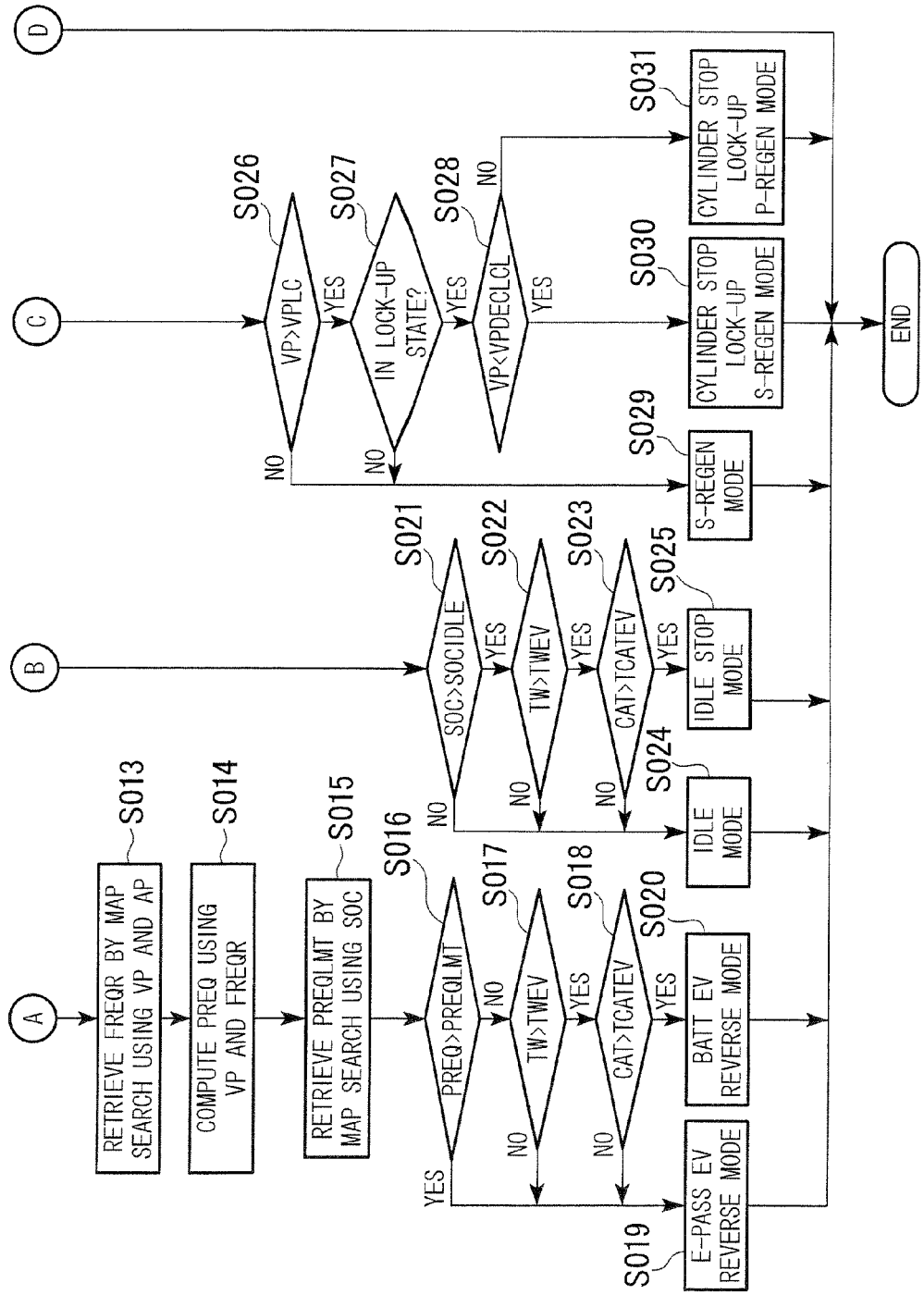
FIG. 21 is also a flowchart for determining the operation.

Below, an operation determination process for determining the operation mode will be explained with reference to a flowchart shown in FIGS. 20 and 21.

In the first step S001 it is determined whether the shift position is the R (reverse) position. When the result of the determination is "YES", the operation proceeds to step S013, and when it is "NO", the operation proceeds to step S002.

In step S013, a required driving force FREQR (for the backward movement) is retrieved from a map (i.e., a map search is performed) based on the vehicle speed VP and the accelerator-pedal opening degree AP, and in the following step S014, a required output power PREQ is computed in accordance with the vehicle speed VP and the required driving force FREQR (for the backward movement). The operation then proceeds to step S015.

In step S015, a permissive upper-limit output power PREQLMT for the driving operation in the BATT EV mode is retrieved from a map, based on an amount of remaining power (called "SOC") of the battery LB.

In the following step S016, it is determined whether the required output power PREQ is higher than the permissive upper-limit output power PREQLMT. When the result of the determination is "YES", the operation proceeds to step S019, and when it is "NO", the operation proceeds to step S017.

In step S019, the E-PASS EV REVERSE mode (see FIG. 4) is selected, and the process of the present flowchart is terminated. This mode is selected because no electric power is supplied from the battery LB, and thus the required output power must be obtained by operating the engine E.

In step S017, it is determined whether the engine water temperature TW is higher than a lower-limit engine water temperature TWEV for making the vehicle run in the BATT EV mode. When the result of the determination is "YES", the operation proceeds to step S018, and when it is "NO", the operation proceeds to step S019. The above determination is executed because when the engine water temperature TW is low, the engine E should be started. The above lower-limit engine water temperature TWEV has an identical value to a lower-limit engine water temperature for executing the idle stop operation, which is explained later.

In step S018, it is determined whether the catalyst temperature CAT is higher than a lower-limit catalyst temperature TCATEV for making the vehicle run in the BATT EV mode. When the result of the determination is "YES", the operation proceeds to step S020, and when it is "NO", the operation proceeds to step S019.

In step S020, the BATT EV REVERSE mode (see FIG. 5) is selected, and the process of the present flowchart is terminated. This mode is selected because when the catalyst temperature CAT is low, the engine E should be started. The above lower-limit catalyst temperature TCATEV has an identical value to a lower-limit catalyst temperature for executing an idle stop operation, which is explained later.

In step S002, it is determined whether the shift position is the P (parking) or N (neutral) position. When the result of the determination is "YES", the operation proceeds to step S021, and when it is "NO", the operation proceeds to step S003.

In step S021, it is determined whether the amount SOC of remaining power of the battery LB is larger than a lower-limit SOCIDLE for executing the idle stop operation. This determination is performed so as to determine whether the amount SOC is sufficient for executing the idle stop operation. When the result of the determination in step S021 is "YES", the operation proceeds to step S022, and when it is "NO", the operation proceeds to step S024. In step S024, the IDLE mode (see FIG. 9) is selected, and the process of the present flowchart is terminated.

In step S022, it is determined whether the engine water temperature TW is higher than the lower-limit engine water temperature TWEV for executing the idle stop operation. When the result of the determination is "YES", the operation proceeds to step S023, and when it is "NO", the operation proceeds to step S024.

In step S023, it is determined whether the catalyst temperature CAT is higher than the lower-limit catalyst temperature TCATEV for executing the idle stop operation. When the result of the determination is "YES", the operation proceeds to step S025, and when it is "NO", the operation proceeds to step S024. In step S025, the IDLE stop mode (see FIG. 8) is selected, and the process of the present flowchart is terminated.

In step S003, it is determined whether a braking operation has been performed. When the result of the determination is "YES", the operation proceeds to step S004, and when it is "NO", the operation proceeds to step S005.

In step S004, it is determined whether the vehicle speed VP is zero. When the result of the determination is "YES", the vehicle stands still, and the operation proceeds to step S021. When the result of the determination is "NO", the vehicle is running and the operation proceeds to step S005.

In step S005, a required driving force FREQF (for the forward movement) is retrieved from a map (i.e., a map search is performed) based on the vehicle speed VP and the accelerator-pedal opening degree AP, and in the following step S006, the required output power PREQ is computed in accordance with the vehicle speed VP and the required driving force FREQF (for the forward movement). The operation then proceeds to step S007.

In step S007, it is determined whether the required driving force FREQF (for the forward movement) is less than zero. When the result of the determination is "YES" (i.e., in deceleration), the operation proceeds to step S026, and when it is "NO", the operation proceeds to step S008.

In step S026, it is determined whether the vehicle speed VP is higher than a lock-up clutch fastening lower-limit vehicle speed VPLC for fastening the clutch C. When the result of the determination is "YES" (i.e., the vehicle speed VP has a value for implementing the lock-up state), the operation proceeds to step S027, and when it is "NO" (i.e., the lock-up state cannot be implemented by the vehicle speed VP), the operation proceeds to step S029.

In step S029, the S-REGEN mode (see FIG. 6) is selected, and the process of the present flowchart is terminated.

In step S027, it is determined whether the lock-up state is active. When the result of the determination is "YES", the operation proceeds to step S028, and when it is "NO", the operation proceeds to step S029. This determination is performed because in the vehicle having a high vehicle speed and a disconnected clutch, a larger amount of loss occurs by increasing the engine speed NE so as to implement the lock-up state, and it is preferable to select the S-REGEN mode (see FIG. 6) in step S029 without performing such an operation.

In step S028, it is determined whether the vehicle speed VP is lower than a lock-up clutch fastening lower-limit vehicle speed VPDECLCL defined for deceleration. This determination is performed so as to determine whether the regeneration should be performed using the first motor M1 or the second motor M2, in consideration of the efficiency of the motor. When the result of the determination in step S028 is "YES", the operation proceeds to step S030, and when it is "NO", the operation proceeds to step S031.

In step S030, the cylinder stop lock-up S-REGEN mode (see FIG. 18) is selected, and the process of the present flowchart is terminated. In step S031, the cylinder stop lock-up P-REGEN mode (see FIG. 19) is selected, and the process of the present flowchart is terminated. The above selection is performed because (i) with respect to the second motor M2, the higher the rotation speed (i.e., the vehicle speed), the higher the efficiency, and (ii) with respect to the first motor M1, the lower the rotation speed (i.e., the vehicle speed), the higher the efficiency.

In step S008, it is determined whether the vehicle speed VP is higher than the lock-up clutch fastening lower-limit vehicle speed VPLC. This determination is performed because the lock-up connection cannot be executed until the vehicle speed reaches a certain level. Based on this determination, it is determined whether the running (of the vehicle) using the first motor M1 is performed. When the result of the determination in step S008 is "YES", the operation proceeds to step S009, and when it is "NO", the operation proceeds to step S032.

In step S009, a lock-up clutch fastening upper-limit driving force FLCPLT is retrieved from a map based on the vehicle speed VP and the amount SOC of remaining power of the battery LB. This map search is performed based on a map shown in FIG. 23 in which the horizontal axis indicates the vehicle speed VP (km/h) while the vertical axis indicates the driving force (N), and also in consideration of the amount SOC of remaining power of the battery LB.

Figure 23:
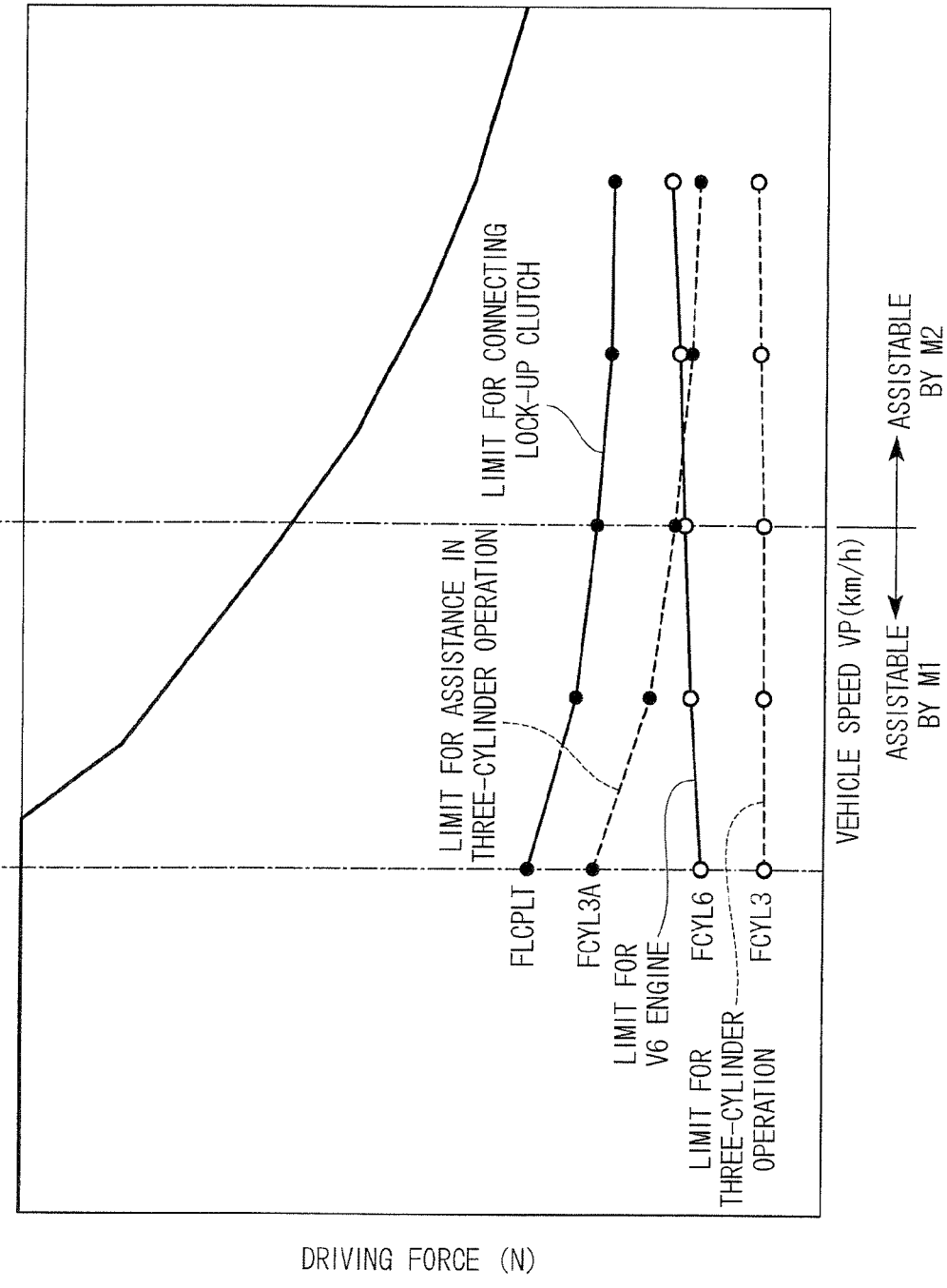
FIG. 23 is a chart showing a relationship between the driving force and the vehicle speed.

As shown in FIG. 23, when the vehicle speed VP is higher than the lock-up clutch fastening lower-limit vehicle speed VPLC, the following four limits are defined with respect to the driving force: (i) the lock-up clutch fastening upper-limit driving force FLCPLT (i.e., the limit for implementing the lock-up connection of the clutch C), (ii) an upper-limit driving force FCYL3A for implementing a cylinder-stop enlarged assistance operation mode (i.e., the limit for the driving force assistance with respect to the three-cylinder operation), (iii) an upper-limit driving force FCYL6 for implementing a V6 operation mode (i.e., the limit for the V6 engine), and (iv) an upper-limit driving force FCYL3 for implementing a cylinder-stop operation mode (i.e., the limit for the three-cylinder operation). With respect to a line (shown in FIG. 23) assigned to each of the above limits, a higher-speed area and a lower-speed area are defined on either side of an upper-limit vehicle speed VPTMASTH for performing the driving force assistance using the first motor M1 during the lock-up mode. In the higher-speed area, the driving force assistance is performed using the second motor M2, and in the lower-speed area, the driving force assistance is performed using the second motor M1.

The second motor M2 rotates at the same rotation speed as that of the engine E; thus, it is used at a higher rotation speed in comparison with the first motor M1. Therefore, when the vehicle speed reaches a level (i.e., the upper-limit vehicle speed VPTMASTH for performing the driving force assistance using the first motor M1 during the lock-up mode), at which the efficiency of the driving force assistance is degraded if using the first motor M1, it is preferable to use the second motor M2 for the driving force assistance at a higher vehicle speed (i.e., than VPTMASTH) at which the second motor M2, having a higher rotation speed, has a higher efficiency, and it provides lower loss.

In the next step S010, it is determined whether the required driving force FREQF (for the forward movement) is less than the lock-up clutch fastening upper-limit driving force FLCPLT. This determination is performed because when FREQF is larger than FLCPLT, a shock occurs and the lock-up connection cannot be performed. When the result of the determination is "YES", the operation proceeds to step S011, and when it is "NO", the operation proceeds to step S032.

In step S011, a lock-up parallel mode is selected, and in the next step S012, a process (see FIG. 22) of selecting a mode in the lock-up parallel mode is performed. This process will be explained later.

In step S032, the permissive upper-limit driving output PREQLMT for the BATT EV mode is retrieved from a map (i.e., a map search is performed) based on the amount SOC of remaining power of the battery LB, and the operation proceeds to step S033.

In step S033, it is determined whether the required output power PREQ is higher than the upper-limit driving output PREQLMT for the BATT EV mode. This determination is performed so as to determine whether the running (of the vehicle) using only the battery LB is possible. When the result of the determination in step S033 is "YES", the operation proceeds to step S037, and when it is "NO", the operation proceeds to step S034.

In step S037, it is determined whether the amount SOC of remaining power of the battery LB is less than a lower-limit SOCCHG of remaining power for performing a forced charging operation. When the result of the determination is "YES" (i.e., charging is necessary), the operation proceeds to step S036, and when it is "NO" (i.e., charging is unnecessary), the operation proceeds to step S038.

In step S036, the CHARGE EV mode (see FIG. 7) is selected, and the process of the present flowchart is terminated.

In step S038, the E-PASS EV mode (see FIG. 4) is selected, and the process of the present flowchart is terminated.

In step S034, it is determined whether the engine water temperature TW is higher than the lower-limit engine water temperature TWEV for making the vehicle run in the BATT EV mode. When the result of the determination is "YES", the operation proceeds to step S035, and when it is "NO" (i.e., when the engine E should be driven), the operation proceeds to step S037.

In step S035, it is determined whether the catalyst temperature CAT is higher than the lower-limit catalyst temperature TCATEV for making the vehicle run in the BATT EV mode. When the result of the determination is "YES", the operation proceeds to step S039, and when it is "NO" (i.e., when the engine E should be driven), the operation proceeds to step S037.

In step S039, the BATT EV mode (see FIG. 5) is selected, and the process of the present flowchart is terminated.

Figure 22:
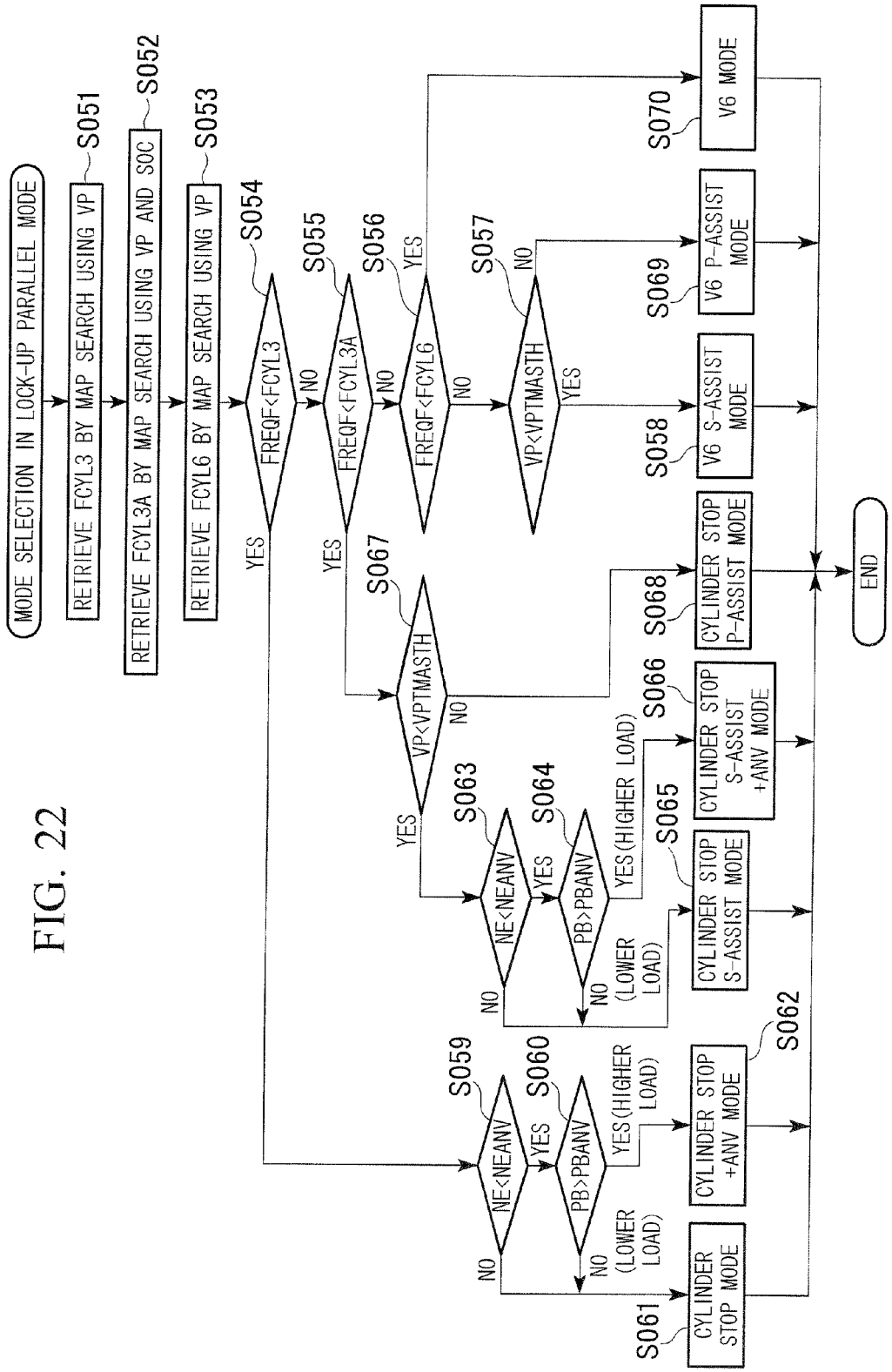
FIG. 22 is a flowchart of a process of selecting a mode in the lock-up parallel mode.

Below, the process of selecting a mode in the lock-up parallel mode will be explained with reference to a flowchart shown in FIG. 22. In the explanation, each mode to be selected belongs to the lock-up mode, which is indicated by the term "lock-up" enclosed in brackets. In FIG. 22, the term "lock-up" is omitted.

In the first step S051, the upper-limit driving force FCYL3 for implementing the cylinder-stop operation mode is retrieved from a map (i.e., a map search is performed) based on the vehicle speed VP.

In the following step S052, the upper-limit driving force FCYL3A for implementing the cylinder-stop enlarged assistance operation mode is retrieved from a map based on the vehicle speed VP and the amount SOC of remaining power of the battery LB.

In the following step S053, the upper-limit driving force FCYL6 for implementing the V6 operation mode is retrieved from a map based on the vehicle speed VP. The operation then proceeds to step S054.

Each of the above map-search steps is performed based on the above-described map shown in FIG. 23 in which the horizontal axis indicates the vehicle speed VP (km/h) while the vertical axis indicates the driving force (N), and also in consideration of the amount SOC of remaining power of the battery LB (in case of step S052).

In step S054, it is determined whether the required driving force FREQF (for the forward movement) is less than the upper-limit driving force FCYL3 for implementing the cylinder-stop operation mode. When the result of the determination is "YES", the operation proceeds to step S059, and when it is "NO", the operation proceeds to step S055.

In step S059, it is determined whether the engine speed NE is lower than an upper-limit engine speed NEANV for performing vibration control. When the result of the determination is "YES", the operation proceeds to step S060, and when it is "NO", the operation proceeds to step S061.

In step S061, the cylinder stop (lock-up) mode (see FIG. 12) is selected, and the process of the present flowchart is terminated.

In step S060, it is determined whether the intake-pipe negative pressure PB belongs to a higher-load range (in which the absolute value of the negative pressure is relatively large) in comparison with a lower-limit intake-pipe negative pressure PBANV for performing the vibration control, that is, whether PB is higher than PBANV. When the result of the determination is "YES" (i.e., in the higher-load range), the operation proceeds to step S062, and when it is "NO" (i.e., in a lower-load range), the operation proceeds to step S061.

In step S062, the cylinder stop (lock-up)+ANV mode (see FIG. 14) is selected, and the process of the present flowchart is terminated.

Figure 24:
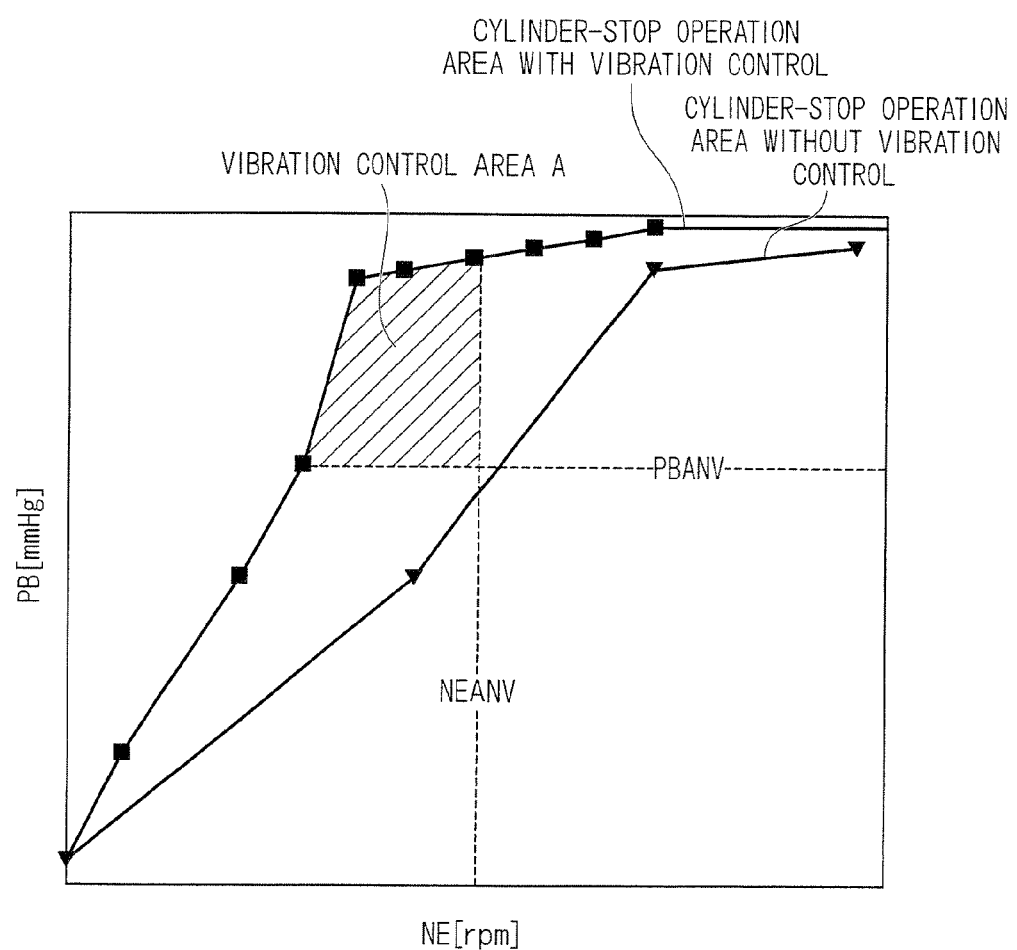
FIG. 24 is a chart showing a relationship between the intake-pipe negative pressure and the engine speed.

FIG. 24 shows a map in which the horizontal axis indicates the engine speed NE (rpm) while the vertical axis indicates the intake-pipe negative pressure PB (mmHg). The upper-limit engine speed NEANV and the lower-limit intake-pipe negative pressure PBANV for performing the vibration control are defined in this map, and the vibration control is performed in a vibration control area A (see the hatched area in FIG. 24) defined by NEANV and PBANV. That is, in order to enlarge the cylinder-stop operation area without vibration control (i.e., when no vibration control is performed), the engine E provides a vibration in an area (i.e., the vibration control area A in FIG. 24) having a low engine speed (i.e., lower than the upper-limit engine speed NEANV) and a high load (i.e., having a higher negative pressure than the lower-limit intake-pipe negative pressure PBANV). Therefore, as shown in FIG. 24, the vibration control is effectively performed in this area so as to provide a cylinder-stop operation area with vibration control, which is wider than the cylinder-stop operation area without vibration control.

In step S055, it is determined whether the required driving force FREQF (for the forward movement) is less than the upper-limit driving force FCYL3A for implementing the cylinder-stop enlarged assistance operation mode. When the result of the determination is "YES", the operation proceeds to step S067, and when it is "NO", the operation proceeds to step S056.

In step S067, it is determined whether the vehicle speed VP is lower than the upper-limit vehicle speed VPTMASTH for performing the driving force assistance using the first motor M1 during the lock-up mode. When the result of the determination is "YES", the operation proceeds to step S063, and when it is "NO", the operation proceeds to step S068.

In step S068, the cylinder stop (lock-up) P-ASSIST mode (see FIG. 13) is selected so as to perform the driving force assistance using the second motor M2 while the cylinder-stop operation is performed. The process of the present flowchart is then terminated.

In step S063, it is determined whether the engine speed NE is lower than the upper-limit engine speed NEANV for performing the vibration control. When the result of the determination is "YES", the operation proceeds to step S064, and when it is "NO", the operation proceeds to step S065.

In step S065, the cylinder stop (lock-up) S-ASSIST mode (see FIG. 16) is selected so as to perform the driving force assistance using the first motor M1 while the cylinder-stop operation is performed. The process of the present flowchart is then terminated.

In step S064, it is determined whether the intake-pipe negative pressure PB belongs to the higher-load range (in which the absolute value of the negative pressure is relatively large) in comparison with the lower-limit intake-pipe negative pressure PBANV for performing the vibration control, that is, whether PB is higher than PBANV. When the result of the determination is "YES" (i.e., in the higher-load range), the operation proceeds to step S066, and when it is "NO" (i.e., in the lower-load range), the operation proceeds to step S065.

In step S066, the cylinder stop (lock-up) S-ASSIST+ANV mode (see FIG. 17) is selected so as to perform (i) the driving force assistance using the first motor M1 and (ii) the vibration control using the second motor M2, while the cylinder-stop operation is performed. The process of the present flowchart is then terminated.

In step S056, it is determined whether the required driving force FREQF (for the forward movement) is less than the upper-limit driving force FCYL6 for implementing the V6 operation mode. When the result of the determination is "YES", the operation proceeds to step S070, and when it is "NO", the operation proceeds to step S057.

In step S070, the V6 (lock-up) mode (see FIG. 10) is selected, and the process of the present flowchart is terminated.

In step S057, it is determined whether the vehicle speed VP is lower than the upper-limit vehicle speed VPTMASTH for performing the driving force assistance using the first motor M1 during the lock-up mode. When the result of the determination is "YES", the operation proceeds to step S058, and when it is "NO", the operation proceeds to step S069.

In step S058, the V6 (lock-up) S-ASSIST mode (see FIG. 15) for performing the driving force assistance using the first motor M1 is selected, and the process of the present flowchart is terminated.

In step S069, the V6 (lock-up) P-ASSIST mode (see FIG. 11) for performing the driving force assistance using the second motor M2 is selected, and the process of the present flowchart is terminated.

In accordance with the above-described embodiment, in step S067, it is determined whether the vehicle speed VP is lower than the upper-limit vehicle speed VPTMASTH for performing the driving force assistance using the first motor M1 during the lock-up mode, and when the vehicle speed VP is higher than or equal to the upper-limit vehicle speed VPTMASTH, the cylinder stop (lock-up) P-ASSIST mode (see FIG. 13) is selected in step S068 so as to perform the driving force assistance using the second motor M2. In contrast, when the vehicle speed VP is lower than the upper-limit vehicle speed VPTMASTH, if the engine speed is high or the load is low (i.e., "NO" in step S063 or S064), by which no engine vibration occurs, then the cylinder stop (lock-up) S-ASSIST mode (see FIG. 16) is selected in step S065 so as to perform the driving force assistance using the first motor M1.

Therefore, the driving force assistance can be effectively performed using one of the first motor M1 and the second motor M2 during the cylinder stop operation for reducing the fuel consumption. That is, a use-range (or area) difference between both motors is considered, more specifically, in a higher vehicle-speed area with respect to the upper-limit vehicle speed VPTMASTH for performing the driving force assistance using the first motor M1, the second motor M2 is used, and in a lower vehicle-speed area with respect to VPTMASTH, the first motor M1 is used, thereby reducing a loss. Accordingly, the electric power consumption can be minimized while a required driving force is provided, so that the fuel consumption can be further improved, thereby also improving salability In addition, when the vehicle speed VP is lower than the upper-limit vehicle speed VPTMASTH, if the engine speed is low and the load is high, which causes an engine vibration due to an unbalanced state during the cylinder stop operation, then the cylinder stop lock-up S-ASSIST+ANV mode is selected so as to perform (i) the driving force assistance using the first motor M1 and (ii) the vibration control using the second motor M2 so as to cancel the vibration.

Therefore, the above vibration control satisfies a request for the driving force assistance while maintaining a low fuel-consumption state obtained by the cylinder stop operation. Such an enlarged cylinder-stop operation can improve the fuel consumption, thereby providing preferable salability.

In particular, the driving force assistance can be performed only using the first motor M1 while the driving force of the second motor M2 can be used only for the vibration control;

thus, both the vibration control and the driving force assistance can be performed without providing an undesirable influence on each other. That is, if the second motor M2 is used for both the vibration control and the driving force assistance, the amount of driving force for assistance is restricted due to the vibration control. Such a restriction does not occur in the present embodiment.

If, in step S054, the required driving force FREQF (for the forward movement) is less than the upper-limit driving force FCYL3 for implementing the cylinder-stop operation mode (i.e., "YES" in step S054), then a cylinder stop (lock-up) mode is selected in step S061 or S062 in which the engine E is operated in the cylinder stop mode while the clutch C is connected (i.e., in the lock-up state, selected when "YES" in step S010), so that the vehicle runs while generating electric power by the second motor M2 which is driven by the engine E. Therefore, when a relatively small driving force FREQF (for the forward movement) is required, a surplus of the driving force of the engine E can be used for generating electric power via the second motor M2, thereby improving the fuel consumption.

In this case, if the engine E has a low engine speed and the load is high, an engine vibration occurs, which can be cancelled using the cylinder stop (lock-up)+ANV mode (see step S062) for performing the vibration control by driving the second motor M2 so as to maintain the cylinder stop operation. Therefore, it is possible to maintain the cylinder stop operation by canceling the engine vibration while the second motor M2 is continuously driven by the engine E. Accordingly, electric power generation using the second motor M2 can be continuously performed, thereby improving the fuel consumption.

In addition, as shown in FIG. 24, no vibration occurs in the engine E when only one of the following conditions is satisfied during the cylinder stop (lock-up) operation: (i) the engine speed NE is lower than the upper-limit engine speed NEANV for performing the vibration control (i.e., "YES" in step S059 or S063), and (ii) the intake-pipe negative pressure PB belongs to a higher-load range (in which the absolute value of the negative pressure is relatively large) in comparison with the lower-limit intake-pipe negative pressure PBANV for performing the vibration control (i.e., "YES" in step S060 or S064). Therefore, in this case, the cylinder stop operation can be maintained. However, if both of the above conditions are satisfied, an engine vibration is inevitable, and the cylinder stop operation cannot be maintained.

Accordingly, the engine speed NE and the intake-pipe negative pressure PB are monitored so as to determine whether the second motor M2 is driven for the vibration control. The second motor M2 is driven for the vibration control only when both the above conditions are satisfied (see steps S062 and S066). Therefore, it is possible to maximize the cylinder stop operation area which is restricted by the engine speed NE and the intake-pipe negative pressure PB, and thus to improve the fuel consumption in response to the enlarged cylinder stop operation area.

As described above, (i) the operation mode is switched actively, in particular, in accordance with the required driving force FREQF (for the forward movement), (ii) one of the first motor M1 and the second motor M2, which is more efficient, can be selected for assisting the driving force of the engine E, and (iii) the second motor M2 can be driven for the vibration control (when necessary) so as to enlarge the cylinder-stop operation area. Therefore, it is possible to considerably improve the fuel consumption.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

For example, the above embodiment employs an engine having a cylinder-stop operation mode as the low fuel-consumption operation mode. However, the present invention can also be applied to a vehicle having an engine which can perform a lean-burn operation or an HCCI operation (in which a gasoline engine performs self ignition by direct jetting).

Also in the above embodiment, the speed change box is a 5-speed gear box; however, it may also be a 6-speed gear box.

Also in the above embodiment, the engine has six cylinders and three of them can be stopped in the cylinder stop operation. However, the present invention can also be applied to a vehicle having any engine which can perform a cylinder stop operation, for example, an engine having four cylinders in which one or two cylinders are stopped in the cylinder stop operation.

In a variation of the above embodiment, front wheels are driven using the engine E and the second motor M2 while rear wheels are driven using the first motor M1.

In addition, the battery device is not limited to the battery LB, and the present invention can also be applied to a vehicle having a capacitor as the battery device.

What is claimed is:

1. A drive control apparatus for a hybrid vehicle, wherein:
the hybrid vehicle comprises:
   an engine which is selectively set in one of a normal fuel-consumption operation mode and a low fuel-consumption operation mode for obtaining a lower fuel consumption in comparison with the normal fuel-consumption operation mode;
   a generator/motor as a first motor selectively used for being driven by the engine and assisting driving of the engine;
   a motor as a second motor for generating a driving force of the vehicle by electric power supplied by the generator/motor or a battery device; and
   a clutch provided between the generator/motor and wheels of the vehicle, and
the drive control apparatus comprises:
   a control part for performing a low fuel-consumption driving assistance mode when the engine is set in the low fuel-consumption operation mode, wherein in the low fuel-consumption driving assistance mode:
   the clutch is connected; and
   driving of the vehicle is assisted using the generator/motor in accordance with an operation state of the vehicle;
   wherein:
      when a vehicle speed of the vehicle is lower than a threshold which is determined in consideration of efficiencies of the generator/motor and the second motor, the control part performs a low fuel-consumption motor driving-assistance mode in which the second motor is selected for assisting the driving of the vehicle, and
      when the vehicle speed is higher than or equal to the threshold, the control part performs a low fuel-consumption generator/motor driving-assistance mode in which the generator/motor is selected for assisting the driving of the vehicle;

wherein:
when a required driving force of the vehicle is smaller than zero,
if the clutch is disconnected, the control part performs an series regeneration (S-REGEN) mode in which regeneration of electric power is performed using the second motor,
if the clutch is connected and the vehicle speed is lower than a predetermined value, then the control part performs a cylinder stop lock-up S-REGEN mode in which the engine performs the cylinder stop operation, and regeneration of electric power is performed using the generator/motor, and
if the clutch is connected and the vehicle speed is higher than or equal to the predetermined value, then the control part performs a cylinder stop lock-up parallel regeneration (P-REGEN) mode in which the engine performs the cylinder stop operation, and regeneration of electric power is performed using the second motor.

2. The drive control apparatus in accordance with claim 1, wherein when one of the generator/motor and the second motor is selected, one having a higher efficiency is selected.

3. The drive control apparatus in accordance with claim 1, wherein:
the engine is capable of performing a cylinder stop operation in the low fuel-consumption operation mode; and
when the driving of the vehicle is assisted using the second motor, the control part performs a cylinder stop driving-assistance vibration-control mode in which the generator/motor is driven for canceling a vibration of the engine.

4. The drive control apparatus in accordance with claim 1, wherein:
when the engine is set in the low fuel-consumption operation mode, the control part performs a low fuel-consumption generator/motor power-generation mode in which:
the clutch is connected, and
when the required driving force is less than a predetermined value, the generator/motor is driven by the engine.

5. The drive control apparatus in accordance with claim 4, wherein:
the engine is capable of performing a cylinder stop operation in the low fuel-consumption operation mode; and
when the low fuel-consumption generator/motor power-generation mode is active, the control part executes a cylinder stop generator/motor power-generation vibration-control mode in which the generator/motor is driven for canceling a vibration of the engine.

6. The drive control apparatus in accordance with claim 5, wherein:
the control part determines whether the generator/motor is driven for canceling the vibration of the engine based on results of measurements of an engine speed and an intake-pipe negative-pressure of the engine.

7. The drive control apparatus in accordance with claim 1, wherein:
when the vehicle speed is lower than or equal to a predetermined value, and the required driving force is larger than or equal to a predetermined value, the control part performs an (EV) mode in which the clutch is disconnected and the driving force of the vehicle is generated by the second motor.

* * * * *